(12) United States Patent
Liu et al.

(10) Patent No.: US 10,680,466 B2
(45) Date of Patent: Jun. 9, 2020

(54) CIRCUITS AND SYSTEMS FOR WIRELESS POWER TRANSMISSION

(71) Applicant: INTEGRATED DEVICE TECHNOLOGY, INC., San Jose, CA (US)

(72) Inventors: Rui Liu, Fremont, CA (US); Tao Qi, San Diego, CA (US)

(73) Assignee: INTEGRATED DEVICE TECHNOLOGY, INC., San Jose, CA (US)

(*) Notice: Subject to any disclaimer, the term of this patent is extended or adjusted under 35 U.S.C. 154(b) by 92 days.

(21) Appl. No.: 15/923,631

(22) Filed: Mar. 16, 2018

(65) Prior Publication Data

US 2018/0269728 A1     Sep. 20, 2018

Related U.S. Application Data

(60) Provisional application No. 62/473,038, filed on Mar. 17, 2017.

(51) Int. Cl.
*H02J 50/12*      (2016.01)
*H01F 27/29*     (2006.01)
*H01F 38/14*     (2006.01)
*H02J 7/02*       (2016.01)

(52) U.S. Cl.
CPC .............. *H02J 50/12* (2016.02); *H01F 27/29* (2013.01); *H01F 38/14* (2013.01); *H02J 7/025* (2013.01)

(58) Field of Classification Search
CPC ................................................. H02J 50/12; H02J 7/025; H01F 27/29; H01F 38/14
USPC ........................................................... 307/104
See application file for complete search history.

(56) References Cited

U.S. PATENT DOCUMENTS

2010/0039234 A1* 2/2010 Soliven .................... H04B 5/02
340/10.1

* cited by examiner

*Primary Examiner* — Carlos Amaya
(74) *Attorney, Agent, or Firm* — Haynes and Boone, LLP

(57) ABSTRACT

Circuits and systems for wireless power transmission include a driver circuit having first and second power terminals, a tapped coil, a first resonant tank, and a second resonant tank. The tapped coil includes a first, second, and third coil terminals, a first coil connected between the first and second coil terminals, and a second coil connected between the second and third coil terminals. The first resonant tank is coupled between the first and second power terminals. The second resonant tank is coupled between the first and second power terminals. The driver circuit is configured to provide and/or receive modulated power across the first and second power terminals and operate the device by switching between a first mode wherein the first resonant tank uses the first coil and a second mode wherein the second resonant tank uses the first coil and the second coil.

18 Claims, 3 Drawing Sheets

CIRCUITS AND SYSTEMS FOR WIRELESS POWER TRANSMISSION

RELATED APPLICATIONS

The present disclosure claims priority to U.S. Provisional Application Ser. No. 62/473,038, filed on Mar. 17, 2017, which is herein incorporated by reference in its entirety.

FIELD

The present disclosure relates generally to circuits and systems for wireless power transmission.

BACKGROUND

Battery-powered devices (e.g., consumer electronic devices, electric and hybrid automobiles, etc.) are charged from a power source (e.g., AC power outlet) through a charging device. The charging device couples the battery to the power source through an adaptor. The cord extending between the power source and the battery-powered device can take up space. In situations where multiple devices require charging, each with their own charger and cord, the charging area can become cramped and inconvenient.

Approaches are being developed that use over-the-air or wireless power transmission between a transmitter and a receiver coupled to the electronic device. Wireless power transmission using inductive coils is one method considered as an un-tethered method for transferring power wirelessly through a coupled magnetic field. In wireless power transmission, power is transferred by modulating a magnetic field with a transmit coil. On the receiver side, a receiver coil may couple to the magnetic field modulated by the transmit coil, thus, wirelessly receiving power from the transmit coil. The efficiency at which power can be transferred wirelessly depends on the design and size of the transmit and the receive coils as well as the geometry between the transmit and the receive coils.

Because higher power transfer efficiency can result in reduced power consumption and reduced recharging time, it would be advantageous to use coil designs that improve power transfer efficiency. Accordingly, it would be advantageous to use higher efficiency coil designs to support wireless power transmission.

SUMMARY

According to an exemplary embodiment, a wireless power transceiver includes a driver circuit having a first power terminal and a second power terminal, a tapped coil, a first resonant tank, and a second resonant tank. The tapped coil includes a first coil terminal, a second coil terminal, a third coil terminal, a first coil connected between the first coil terminal and the second coil terminal, and a second coil connected between the second coil terminal and the third coil terminal. The first coil terminal is coupled to the first power terminal. The first resonant tank is coupled between the first power terminal and the second power terminal. The second resonant tank is coupled between the first power terminal and the second power terminal. The driver circuit is configured to provide and/or receive modulated power across the first and second power terminals and operate the device by switching between a first mode and a second mode. The first mode wherein the first resonant tank uses the first coil. The second mode wherein the second resonant tank uses the first coil and the second coil.

According to another exemplary embodiment, a wireless power transceiver includes a driver circuit having a first power terminal and a second power terminal, a tapped coil, a first capacitor, a second capacitor, a first switch, and a second switch. The tapped coil includes a first coil terminal, a second coil terminal, a third coil terminal, a first coil connected between the first coil terminal and the second coil terminal, and a second coil connected between the second coil terminal and the third coil terminal. The first coil terminal is coupled to the first power terminal. The first capacitor is coupled between the second coil terminal and the second power terminal. The second capacitor is coupled between the third coil terminal and the second power terminal. The first switch couples the first capacitor between the second coil terminal and the second power terminal. The second switch couples the second capacitor between the third coil terminal and the second power terminal. The driver circuit is configured to provide and/or receive modulated power across the first and second power terminals and control the first and second switches to operate the first coil and the first capacitor as a first resonant tank or the first and second coils and the second capacitor as a second resonant tank.

According to another exemplary embodiment, a tapped coil for use in a wireless power transceiver includes a first terminal, a second terminal, a third terminal, a first coil connected between the first terminal and the second terminal, and a second coil connected between the second terminal and the third terminal. The first coil is designed to be used as part of a high frequency resonant tank. The first and second coils are together designed to be used as part of a low frequency resonant tank.

DETAILED DESCRIPTION

Figure 1:
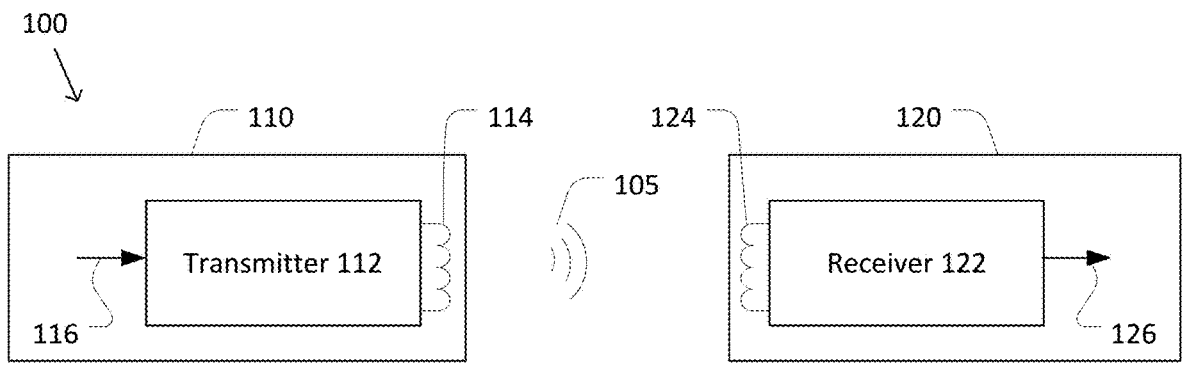
FIG. 1 is a simplified diagram of a wireless power transmission system according to some embodiments.

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions. In addition, to avoid unnecessary repetition, one or more features shown and described in association with one embodiment may be incorporated into other embodiments unless specifically described otherwise or if the one or more features would make an embodiment non-functional.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, controller, and circuits described in connection with the embodiments disclosed herein may be implemented or performed with a general-purpose processor, a special-purpose processor, a Digital Signal Processor (DSP), an Application-Specific Integrated Circuit (ASIC), a Field-Programmable Gate Array (FPGA) or other programmable logic device, a controller, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

It should be recognized that the devices of a wireless power transmission system is described herein primarily with respect to functionality of wireless power transmission; however, it should be recognized that the wireless power transmission system may include additional components to perform other features not specifically described herein or shown in the various figures. For example, wireless power transmission systems may include I/O modules for interfacing with a processor or other computing device to provide the bit pattern to be emulated, memory for storing instructions and data, various sensors, processors, controllers, voltage regulators, among other components. The figures and accompanying description may, therefore, be somewhat simplified to focus on the various apparatuses and methods that are configured for wireless power transmission. In addition, the principles and operation as described herein may be used for other purposes besides wireless power transmission including magnetic secure transmission, communication, and/or the like.

FIG. 1 is a simplified diagram of a wireless power transmission system 100 according to some embodiments. Wireless power transmission system 100 includes a wireless power transmitting apparatus 110 and a wireless power receiving apparatus 120. The wireless power transmitting apparatus 110 includes a wireless power transmitter 112 having a transmit coil 114 configured to generate a magnetic field 105 for providing power transfer to wireless power receiving apparatus 120. Wireless power receiving apparatus 120 includes a wireless power receiver 122 having a receive coil 124 configured to couple with the magnetic field 105. Transmit coil 114 and receive coil 124 may be sized according to the particular devices and applications to be associated therewith. Magnetic field 105 may also be referred to as wireless power signal 105 for power transfer from wireless power transmitter 112 to wireless power receiver 122.

An input signal 116 may be provided to wireless power transmitter 112 for providing wireless power transmitter 112 with the power for generating wireless power signal 105 that provides a power transfer to wireless power receiving apparatus 120. Wireless power receiver 122 may couple to wireless power signal 105 and generate an output signal 126 in response thereto. Output signal 126 may provide the power that is used by wireless power receiving apparatus 120 for storing (e.g., charging a battery), consumption (e.g., providing system power), or both.

In some embodiments, wireless power transmitter 112 and wireless power receiver 122 may be configured according to a mutual inductance relationship, such that when the resonant frequency of wireless power receiver 122 and the resonant frequency of wireless power transmitter 112 are substantially identical, transmission losses between wireless power transmitter 112 and wireless power receiver 122 are minimal. Likewise, the frequency of wireless power signal 105 may be set by wireless power transmitter 112 at or near the resonant frequencies of resonant circuits that include coils 114 and 124. As a result, an efficient power transfer occurs by coupling a large portion of the energy in the time-varying magnetic near-field of transmit coil 114 to receive coil 124. This is in contrast to far-field systems where electromagnetic signals or waves are propagated between antennas. If wireless power receiving apparatus 120 is in the near-field, inductive coupling may occur between transmit coil 114 and receive coil 124. The area around transmit coil 114 and receive coil 124, where this near-field inductive coupling may occur, may be referred to as a "coupling region." Because of this mutual inductance relationship, the wireless power transfer may be referred to as inductive wireless power transfer.

Transmit coil 114 and receive coil 124 may each be configured as a "loop" coil, which may also be referred to herein as a "magnetic" coil or an "inductive" coil. Loop coils may be configured to include an air core or a physical core material such as a ferrite core. Air core loop coils may be more tolerant to extraneous physical devices placed in the vicinity of the core. Furthermore, an air core loop coil allows the placement of other components within the core area. In addition, an air core loop may more readily enable placement of receive coil 124 within a plane of transmit coil 114 where the coupling region of transmit coil 114 may be more powerful.

Wireless power transmitting apparatus 110 may include a wireless power transmitter to transmit wireless power signal 105. Wireless power receiving apparatus 120 may be a mobile electronic device, such as a cell phone, a smart phone, a media player (e.g., mp3 player, DVD player, etc.), an electronic reader, a tablet computer, a personal digital assistant (PDA), a camera, a laptop computer, a personal electronic device, and/or the like in which wireless power signal 105 may be received. Wireless power receiving apparatus 120 may also be a mobile electronic device, such as a cell phone, a smart phone, a television, personal computer, media player (e.g., DVD player, Blu-ray player, etc.), a wearable device (e.g., a smart watch), or any other device that may operate by, and/or store electrical power. Wireless power receiving apparatus 120 may be one of a number of other items, such as an automobile or any other devices that may include batteries that may be charged through wireless power transmitting apparatus 110.

Wireless power transmitting apparatus 110 may be a device that may, at times, also be the recipient of wireless power transfer. In other words, some devices may be configured as both a wireless power transmitting apparatus 110 and a wireless power receiving apparatus 120, such that the device may transmit wireless power or receive wireless power depending on the mode of operation. Thus, embodiments of the present disclosure include devices that may include a wireless charging transceiver configured to operate in either a transmit mode or a receive mode. Using the term "receiver" indicates that a device is configured to receive wireless power transfer, but should not be interpreted to mean that the device only operates as a receiver. Similarly, using the term "transmitter" indicates that the device is configured to transmit wireless power, but should not be interpreted to mean that the device only operates as a transmitter.

Figure 2:
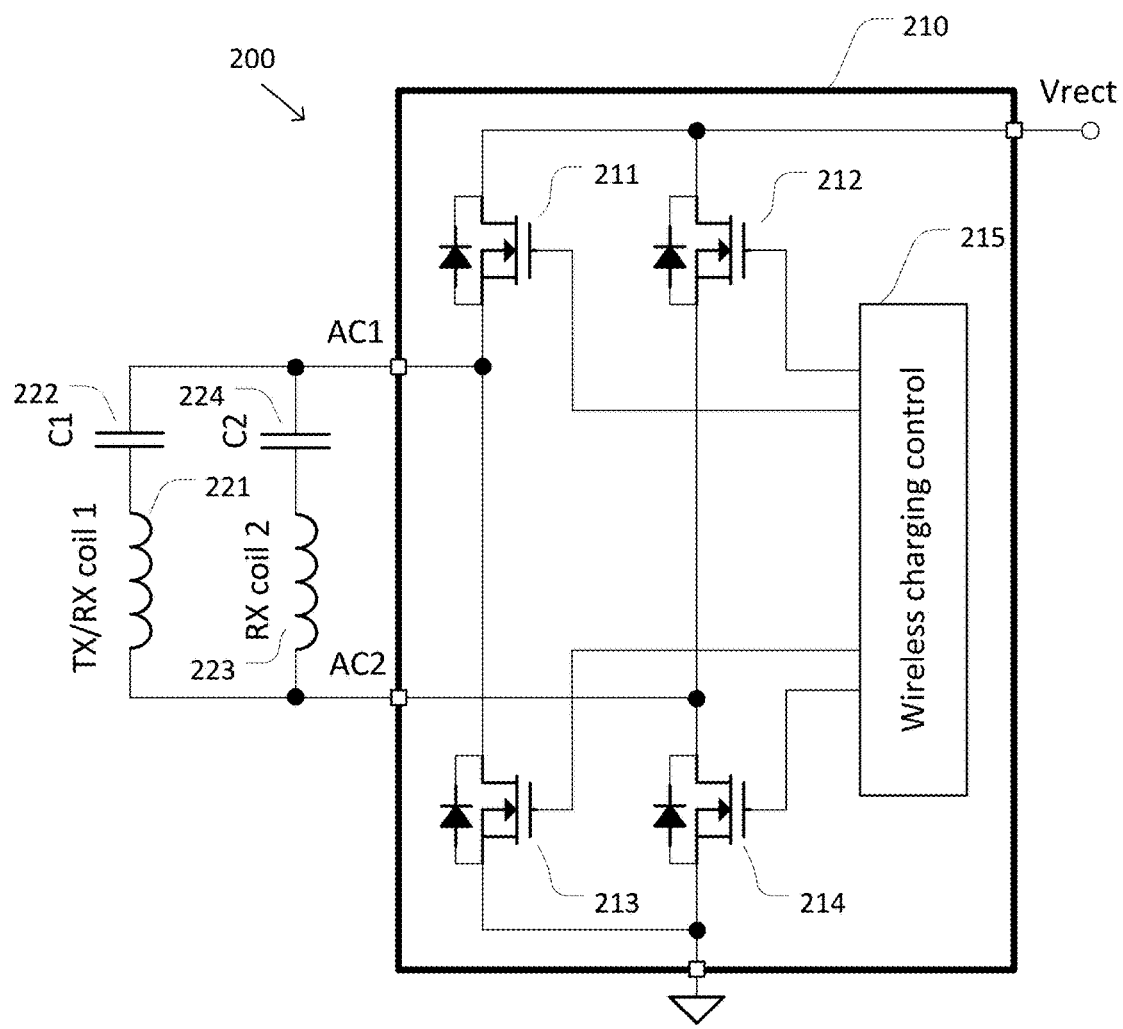
FIG. 2 is a simplified diagram of a wireless power transceiver using parallel resonant tanks according to some embodiments.

A wireless power transceiver that supports both wireless power transmitting and wireless power receiving as well as possibly supporting magnetic secure transmission, communication, and/or the like presents several challenges. Some of these challenges are described with respect to FIG. 2, which is a simplified diagram of a wireless power transceiver 200 using parallel resonant tanks. Wireless power transceiver 200 may be used as wireless power transmitting apparatus 110 and/or wireless power receiving apparatus 120. As shown in FIG. 2, wireless power transceiver 200 includes a driver circuit 210 and two parallel resonant tanks coupled to driver circuit 210 via AC1 and AC2 terminals as power inputs/outputs of driver circuit 210. In some examples, driver circuit 210 may be packaged as an integrated circuit, chip, board, and/or the like. In transmitter mode, the power for wireless power transceiver 200 and driver circuit 210 is provided via a terminal Vrect on driver circuit 210, which may be connected to any type of power supply including one or more batteries, a switching power supply, and/or the like. In receiver mode, the terminal Vrect provides power to a load, such as batteries, and/or the like.

Driver circuit 210 includes a full bridge driver using FETs 211-214. FETs 211-214 are shown as N-channel MOSFETs with an intrinsic body diode that acts as a snubber diode during operation of driver circuit 210 to reduce the presence of unwanted voltage spikes on the resonant tanks when switching occurs; although other FET and switch variations are possible. The drains of FETs 211 and 212 are connected to the Vrect terminal and are used to sink and/or source current from and/or to the resonant tanks either through terminal AC1 or terminal AC2 depending on the direction current is to be driven through the resonant tanks. The source of FET 211 acts as a first terminal of the full bridge driver and is connected to the drain of FET 213 as well as to terminal AC1. The source of FET 212 acts as a second terminal of the full bridge driver and is coupled to the drain of FET 214 and terminal AC2. The sources of FETs 213 and 214 are coupled to ground and are used to sink current from the resonant tanks via terminal AC1 or terminal AC2 depending on the direction current is to be driven through the resonant tanks. The gates of each of FETs 211-214 are connected to respective outputs of a wireless charging controller 215.

The resonant tanks of wireless power transceiver 200 are coupled in parallel between terminals AC1 and AC2 and allow for simultaneous transmitting and receiving of power and/or other communications to/from wireless power transceiver 200. A first one of the resonant tanks includes a transmit/receive coil 221 connected in series with a capacitor 222 with one lead of transmit/receive coil 221 being coupled to terminal AC2 and one lead of capacitor 222 being coupled to terminal AC1. The inductance of transmit/receive coil 221 and the capacitance of capacitor 222 are selected so that the first resonant tank is designed to operate within a first frequency range. A second one of the resonant tanks includes a receive coil 223 connected in series with a capacitor 224 with one lead of receive coil 223 being coupled to terminal AC2 and one lead of capacitor 224 being coupled to terminal AC1. The inductance of receive coil 223 and the capacitance of capacitor 224 are selected so that the second resonant tank is designed to operate within a second frequency range.

Wireless charging controller 215 manages overall operation of driver circuit 210. Respective outputs of wireless charging controller 215 are connected to the gates of FETs 211-214 to control operation of the full bridge driver. During operation, wireless charging controller 215 controls the direction of current flow through the first and second resonant tanks in order to modulate the magnetic fields of the first and second resonant tanks. During wireless power transmission, when wireless charging controller 215 turns on FETs 211 and 214 by operating them in saturation (and turns off FETs 212 and 213 by operating them in cut off), current is sourced to the first and second resonant tanks through terminal AC1 and sunk from the first and second resonant tanks through terminal AC2. And, when wireless charging controller 215 turns on FETs 212 and 213 by operating them in saturation (and turns off FETs 211 and 214 by operating them in cut off), the direction of the magnetic field of the first and second resonant tanks is reversed as current is sourced to the first and second resonant tanks through terminal AC2 and is sunk from the first and second resonant tanks through terminal AC2. Current though the first and second resonant tanks may be stopped by turning off FETs 211-214. During wireless power receiving, FETs 211-214 are operated similarly to control how power is received from the first and/or second resonant tanks through terminals AC1 and AC2.

According to some embodiments, use of parallel resonant tanks in wireless power transceiver 200 solves one or more problems of single resonant tank systems. In some examples, switching a single resonant tank between transmitter mode and receiver mode results in non-optimum operation. In general, a coil in the single resonant tank that is optimized for transmitting is not optimized for receiving and a coil optimized for receiving is not optimized for transmitting. In addition, when the coil is optimized for receiving, its use as a transmitting coil typically results in higher power loss and a greater importance on maintaining good alignment between the coils of the transmitter and receiver in order to obtain efficient wireless power transmission.

According to some embodiments, use of parallel resonant tanks in wireless power transceiver 200 also presents one or more challenges. In some examples, the operation of the first and second resonant tanks in close proximity to each other results in cross coupling between them, which causes power loss due to the increase in effective AC resistance of the respective coils. In some examples, these effects may be somewhat mitigated by tuning the first frequency range of the first resonant tank and the second frequency range of the second resonant tank so they are at least two order of magnitude (100 times) different from each other. In some examples, the use of two separate coils 221 and 223 by the first and second resonant tanks, respectively, takes up a large amount of area in wireless power transceiver 200, which may not be available in small-scale devices such as a cell phone, a smart phone, a media player, a wearable device, and/or the like.

Figure 3:
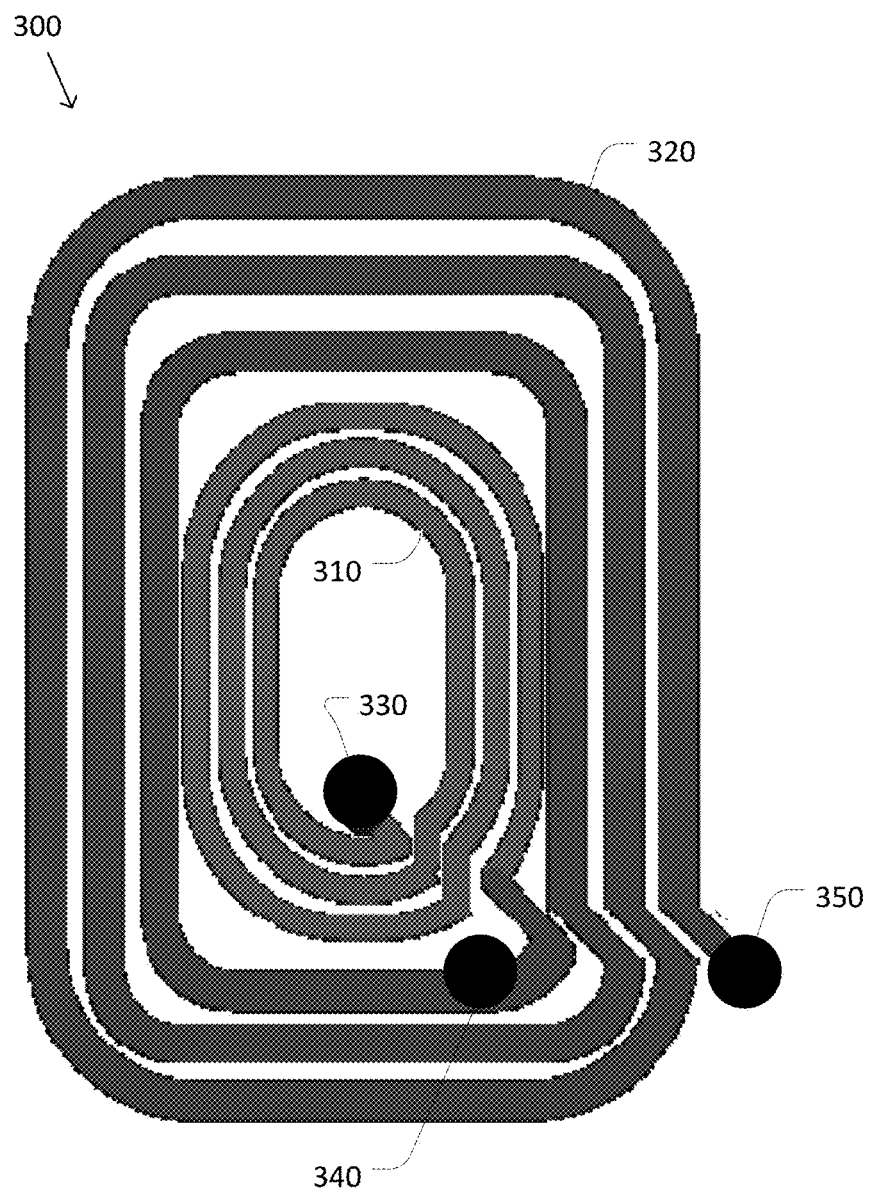
FIG. 3 is a simplified diagram of a tapped coil for use in a wireless power transceiver according to some embodiments.

According to some embodiments, a tapped coil design is usable to address some of the issues associated with the use of parallel resonant tanks. FIG. 3 is a simplified diagram of a tapped coil 300 for use in a wireless power transceiver according to some embodiments. As shown in FIG. 3, tapped coil 300 is divided into separate segments that include a first coil 310 and a second coil 320, respectively. Tapped coil 300 further includes three terminals 330-350, with first coil 310 being wired between terminals 330 and 340 and second coil 320 being wired between terminals 340 and 350. In this configuration, terminal 340 is an interior terminal that marks a connection point between first coil 310 and second coil 320 and further allows circuitry to be connected to one or both of first coil 310 and second coil 320. Depending upon the configuration, tapped coil 300 may be operated as one of three possible coils: a combined coil using both first coil 310 and second coil 320, with first coil 310 alone, or with second coil 320 alone.

In some examples, each segment of tapped coil 300 may be designed with different wire or trace widths, fewer or more loops, different conductor materials, and/or the like to allow for different inductances and/or other characteristics of first coil 310 and second coil 320. In some examples, this allows for tuning of the frequency ranges for resonant tanks using first coil 310 and second coil 320, respectively, to allow for simultaneous operation of the resonant tanks. In some examples, when the resonant tanks are operated one at a time, there is no coupling between the magnetic fields of first coil 310 and second coil 320, thus reducing the losses caused by the increase in effective AC resistance of the resonant tanks. In addition, when tapped coil 300 is operated in just one mode at a time, there is no constraint on the frequency ranges of the corresponding resonant tanks caused by the simultaneous operation of the parallel resonant tanks as described with respect to FIG. 2.

In some examples, the nested arrangement of tapped coil 300 with first coil 310 being nested within second coil 320 may also reduce the amount of overall area occupied by tapped coil 300 relative to the separate coils of FIG. 2.

According to some embodiments, tapped coil 300 with first coil 310 and second coil 320 may be optimized for different uses. In some examples, the smaller size of first coil 310 allows it to provide better wireless power coupling with small devices (e.g., small wearable devices like a smart watch), especially when first coil 310 is used in the transmitting mode. This is because the smaller size of first coil 310 provides better efficiency as well as provides better spatial alignment when trying to orient the receiving coil relative to first coil 310. In some examples, a resonant tank using both first coil 310 and second coil 320 of tapped coil 300 may be well suited for low frequency operation in a receiving mode, first coil 310 may be well suited for high frequency operation in a receiving mode, and/or first coil 310 may be well suited for high frequency operation in a transmitting mode.

According to some embodiments, other configurations are possible for a tapped coil. In some examples, although FIG. 3 shows first coil 310 being nested within second coil 320, other arrangements are possible including side-by-side placement, interleaving, placement of one coil above the other, and/or the like. In some examples, tapped coil 300 may alternatively be separated into more than two segments (such as three, four, or even more segments) with a respective coil in each segment. Additional terminals may them be placed at each connection point between adjacent segments of the tapped coil.

Figure 4:
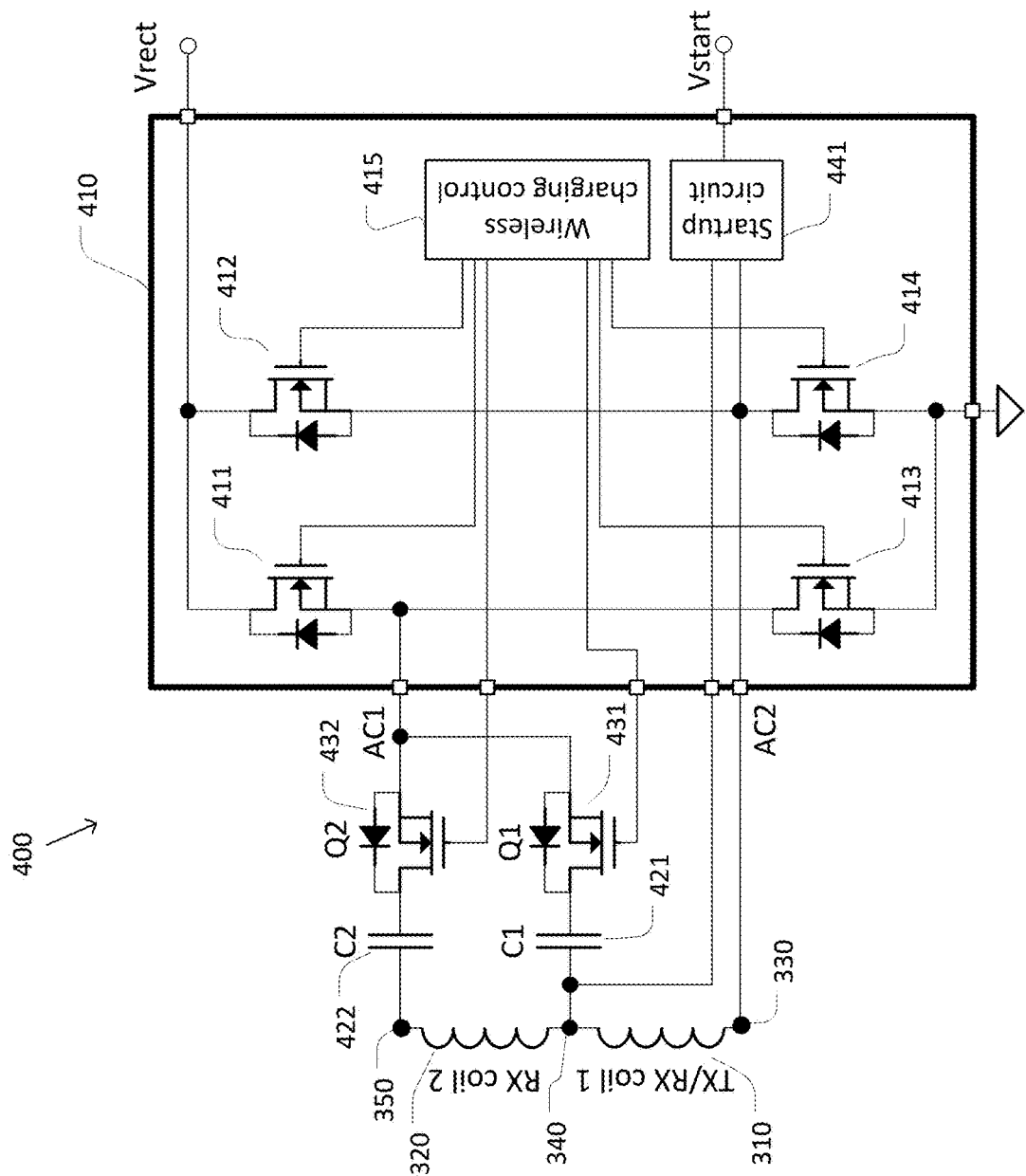
FIG. 4 is a simplified diagram of a wireless power transceiver using the tapped coil of FIG. 3 according to some embodiments.

FIG. 4 is a simplified diagram of a wireless power transceiver 400 using tapped coil 300 according to some embodiments. In some embodiments, wireless power transceiver 400 may be used as wireless power transmitting apparatus 110 and/or wireless power receiving apparatus 120. As shown in FIG. 4, wireless power transceiver 400 includes a driver circuit 410 and resonant tanks constructed using tapped coil 300. The resonant tanks are coupled to driver circuit 410 via AC1 and AC2 terminals as power inputs/outputs of driver circuit 410. In some examples, driver circuit 410 may be packaged as an integrated circuit, chip, board, and/or the like. Power for wireless power transceiver 400 and driver circuit 410 is provided by via a terminal Vrect on driver circuit 410, which may be connected to any type of power supply including one or more batteries, a switching power supply, and/or the like.

Driver circuit 410 includes a full bridge driver using FETs 411-414. FETs 411-414 are shown as N-channel MOSFETs with an intrinsic body diode; although other FET and switch variations are possible. The drains of FETs 411 and 412 are connected to the Vrect terminal and are used to sink and/or source current from and/or to the resonant tanks either through terminal AC1 or terminal AC2 depending on the direction current is to be driven through the resonant tanks. The source of FET 411 acts as a first terminal of the full bridge driver and is connected to the drain of FET 413 as well as to terminal AC1. The source of FET 412 acts as a second terminal of the full bridge driver and is coupled to the drain of FET 414 and terminal AC2. The sources of FETs 413 and 414 are coupled to ground and are used to sink current from the resonant tanks via terminal AC1 or terminal AC2 depending on the direction current is to be driven through the resonant tanks. The gates of each of FETs 411-414 are connected to respective outputs of a wireless charging controller 415.

The resonant tanks of wireless power transceiver 400 are coupled to driver circuit 410 between terminals AC1 and AC2. First coil 310 of tapped coil 300 is connected to terminal AC2 of driver circuit 410 using terminal 330. Terminal 340 of tapped coil 300 is connected to the first lead of a first capacitor 421 so that first coil 310 is connected between terminal AC2 and the first lead of first capacitor 421. Second coil 320 is connected to the first lead of a second capacitor 422 so that second coil 320 is connected between the first lead of first capacitor 421 and second capacitor 422. Further activation and operation of the resonant tanks using tapped coil 300 are controlled using FETs 431 and 432. FETs 431 and 432 are shown as N-channel MOSFETs with an intrinsic body diode; although other FET and switch variations are possible. The sources of both of FETs 431 and 432 are connected to terminal AC1 of driver circuit 410. The drain of FET 431 is connected to the second lead of first capacitor 421 and the drain of FET 432 is connected to the second lead of second capacitor 422. The gates of FETs 431 and 432 are coupled to respective outputs of wireless charging controller 415.

Wireless charging controller 415 manages the active operation of driver circuit 410 and the resonant tanks. Respective outputs of wireless charging controller 415 are connected to the gates of FETs 411-414 to control operation of the full bridge driver. During operation, wireless charging controller 415 controls the direction of current flow through the resonant tanks in order to modulate the magnetic fields of the resonant tanks. During wireless power transmission, when wireless charging controller 415 turns on FETs 411 and 414 by operating them in saturation (and turns off FETs 412 and 413 by operating them in cut off), current is sourced to the resonant tanks through terminal AC1 and sunk from the resonant tanks through terminal AC2. And, when wireless charging controller 415 turns on FETs 412 and 413 by operating them in saturation (and turns off FETs 411 and 414 by operating them in cut off), the direction of the magnetic field of the resonant tanks is reversed as current is sourced to the resonant tanks through terminal AC2 and is sunk from the resonant tanks through terminal AC2. During wireless power receiving, FETs 211-214 are operated similarly to control how power is received from the first and/or second resonant tanks through terminals AC1 and AC2.

Wireless charging controller 415 controls the configuration of the resonant tanks using two outputs coupled, respectively, to the gates of FETs 431 and 432. Using these outputs, wireless charging controller 415 may select between two active resonant tank configurations.

By turning off FET 431 and turning on FET 432 using their respective gates, wireless charging controller 415 configures wireless power transceiver 400 in a first mode with a first resonant tank using both first coil 310 and second coil 320 of tapped coil 300 and second capacitor 422. When FET 431 is off, the AC current from the full bridge driver and terminals AC1 and AC2 is blocked by the body diode of FET 431 from reaching tapped coil 300 via terminal 340. In addition, a DC voltage is accumulated on first capacitor 421, so that the body diode of FET 431 also blocks DC current to tapped coil 300 via terminal 340. In this configuration, the first resonant tank has a frequency range based on the combined inductance of first coil 310 and second coil 320 and the capacitance of second capacitor 422. In some examples, the first resonant tank configuration may be designed for use as a low frequency receiver.

By turning on FET 431 and turning off FET 432 using their respective gates, wireless charging controller 415 configures wireless power transceiver 400 in a second mode with a second resonant tank using just first coil 310 of tapped coil 300 and first capacitor 421. When FET 432 is off, the AC current from the full bridge driver and terminals AC1 and AC2 is blocked by the body diode of FET 432 from reaching tapped coil 300 via terminal 350. In addition, a DC voltage is accumulated on second capacitor 422, so that the body diode of FET 432 also blocks DC current to tapped coil 300 via terminal 350. In this configuration, the second resonant tank has a frequency range based on the inductance of first coil 310 and the capacitance of first capacitor 421. In some examples, the second resonant tank configuration may be designed for use as a high frequency receiver or transmitter.

Wireless charging controller 415 may additionally stop operation of the resonant tanks in wireless power transceiver 400 by turning off FETs 411-414 or FETs 431 and 432, or all of FETs 411-414, 431, and 432.

Driver circuit 410 further includes a startup circuit 441 to support proper initial biasing of FETs 431 and 432 prior to active operation of wireless power transceiver 400. Startup circuit receives power from a Vstart terminal of driver circuit 410 and includes two outputs coupled to terminals 330 and 340, respectively, of tapped coil 300. By providing a biasing voltage across first coil 310, startup circuit 441 is able to provide biasing to FETs 431 and 432 so that when wireless charging controller 415 supplies rectified voltage to terminals AC1 and AC2 using the full bridge driver and attempts to turn on either FET 431 or 432, FETs 431 and 432 will be properly biased. Once active operation of the resonant tanks is begun, startup circuit 441 may remove the biasing voltage from first coil 310. In some examples, startup circuit 441 may include a rectifier, a voltage double, and/or a charge pump in order to convert Vstart to the biasing voltage.

According to some embodiments, wireless power transceiver 400 using tapped coil 300 addresses several of the disadvantages of wireless power transceiver 200 using parallel resonant tanks. In some examples, because the resonant tanks are operated one at a time, there is no coupling between the magnetic fields of separate coils as occurs with the parallel operation of transmit/receive coil 221 and receive coil 223. This reduces the losses caused by the increase in effective AC resistance of the parallel resonant tanks due to the simultaneous coil operation. In addition, because just one of the first resonant tank and second resonant tank configurations are used at a time, the frequency ranges of the first and second resonant tank configuration no longer have to be separated by at least two orders of magnitude as simultaneous low frequency and high frequency operation does not occur.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A wireless power transceiver, the transceiver comprising:
   a driver circuit having a first power terminal and a second power terminal;
   a tapped coil comprising:
      a first coil terminal, a second coil terminal, and a third coil terminal, the first coil terminal being coupled to the first power terminal;
      a first coil connected between the first coil terminal and the second coil terminal; and
      a second coil connected between the second coil terminal and the third coil terminal;
   a first resonant tank coupled between the first power terminal and the second power terminal; and a second resonant tank coupled between the first power terminal and the second power terminal;
wherein the driver circuit is configured to:
provide and/or receive modulated power across the first and second power terminals; and
operate the transceiver by switching between two modes:
a first mode wherein the first resonant tank uses the first coil; and
a second mode wherein the second resonant tank uses the first coil and the second coil.

2. The transceiver of claim 1, wherein:
the first resonant tank comprises a first capacitor coupled between the second coil terminal and the second power terminal;
the second resonant tank comprises a second capacitor coupled between the third coil terminal and the second power terminal; and
the first coil terminal is coupled to the first power terminal.

3. The transceiver of claim 2, wherein:
the first capacitor is coupled between the second coil terminal and the second power terminal using a first switch; and
the second capacitor is coupled between the third coil terminal and the second power terminal using a second switch.

4. The transceiver of claim 3, wherein the driver circuit is further configured to:
operate the transceiver in the first mode by turning the first switch on and turning the second switch off; and
operate the transceiver in the second mode by turning the first switch off and turning the second switch on.

5. The transceiver of claim 3, wherein the first and second switches are n-channel MOSFETs.

6. The transceiver of claim 1, further comprising a startup circuit configured to apply power to the first coil before operating the transceiver in the first or second modes.

7. The transceiver of claim 1, wherein:
the driver circuit further comprises a full bridge driver with outputs connected to the first and second power terminals; and
the driver circuit operates the full bridge driver to provide the modulated power to and/or receive the modulated power from the first resonant tank or the second resonant tank.

8. The transceiver of claim 1, wherein the first coil is nested within the second coil.

9. The transceiver of claim 1, wherein when the transceiver is operated in the first mode, the first coil is a receiver or transmitter operating in a first frequency range.

10. The transceiver of claim 9, wherein when the transceiver is operated in the second mode, the first and second coils are a receiver or transmitter operating in a second frequency range.

11. A wireless power transceiver, the transceiver comprising:
a driver circuit having a first power terminal and a second power terminal;
a tapped coil comprising:
a first coil terminal, a second coil terminal, and a third coil terminal, the first coil terminal being coupled to the first power terminal;
a first coil connected between the first coil terminal and the second coil terminal; and
a second coil connected between the second coil terminal and the third coil terminal;
a first capacitor coupled between the second coil terminal and the second power terminal;
a second capacitor coupled between the third coil terminal and the second power terminal;
a first switch coupling the first capacitor between the second coil terminal and the second power terminal; and
a second switch coupling the second capacitor between the third coil terminal and the second power terminal;
wherein the driver circuit is configured to:
provide and/or receive modulated power across the first and second power terminals; and
control the first and second switches to operate the first coil and the first capacitor as a first resonant tank or the first and second coils and the second capacitor as a second resonant tank.

12. The transceiver of claim 11, wherein the driver circuit is further configured to operate the first coil and the first capacitor as a first resonant tank by turning the first switch on and turning the second switch off.

13. The transceiver of claim 12, wherein the first resonant tank forms a receiver or transmitter operating in a first frequency range.

14. The transceiver of claim 11, wherein the driver circuit is further configured to operate the first coil, the second coil, and the second capacitor as a second resonant tank by turning the first switch off and turning the second switch on.

15. The transceiver of claim 14, wherein the second resonant tank form a receiver or transmitter operating in a second frequency range.

16. The transceiver of claim 11, wherein the first and second switches are n-channel MOSFETs.

17. The transceiver of claim 11, further comprising a startup circuit configured to apply power to the first coil to bias the first and second switches before operating the first and second switches.

18. The transceiver of claim 11, wherein:
the driver circuit further comprises a full bridge driver with terminals connected to the first and second power terminals; and
the driver circuit operates the full bridge driver to modulate power to and/or receive modulated power from the first and second power terminals.

* * * * *